Sept. 12, 1967     A. K. MOULTON     3,341,013
SCREEN STRUCTURE
Filed May 7, 1964
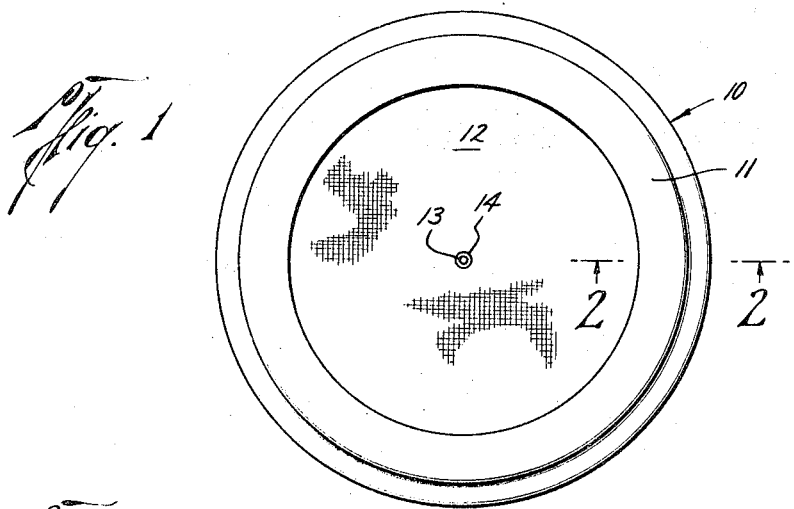
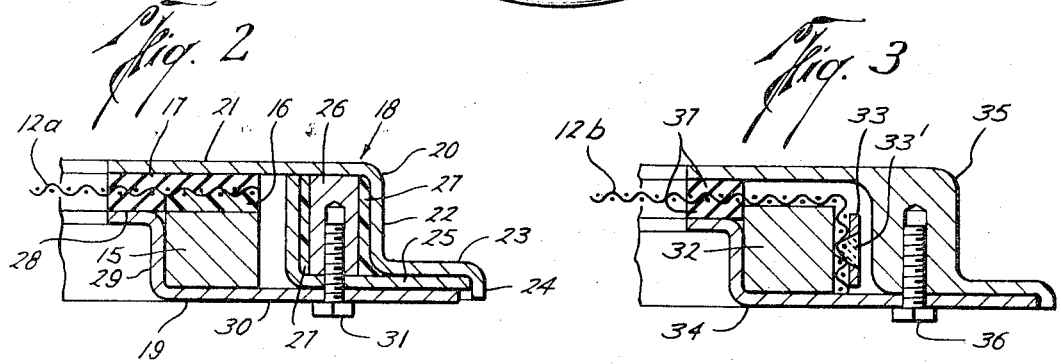
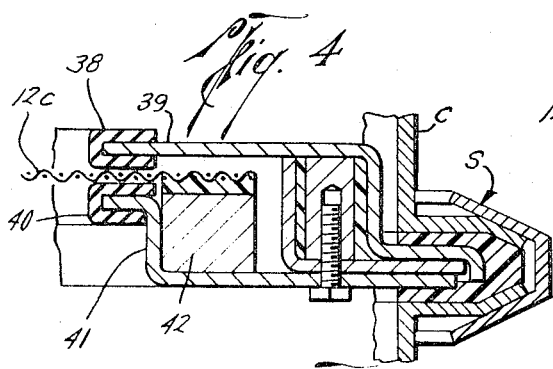
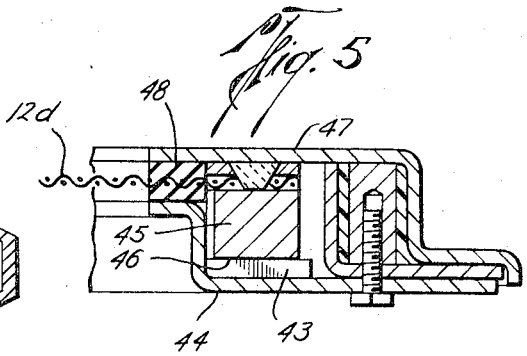
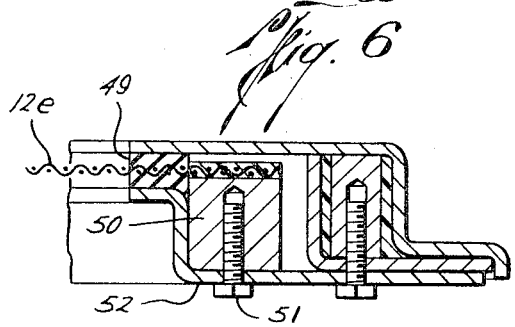
Arthur K. Moulton
INVENTOR.
BY
ATTORNEYS

United States Patent Office 3,341,013
Patented Sept. 12, 1967

3,341,013
SCREEN STRUCTURE
Arthur K. Moulton, P.O. Box 33187,
Houston, Tex. 77033
Filed May 7, 1964, Ser. No. 365,639
7 Claims. (Cl. 209—403)

This invention relates generally to screen structures for material separators and classifiers, and more specifically to a replaceable screen structure for such devices.

Material separator and classifier screen frames are generally fabricated of a thick stainless steel stock having cross-sectional properties to provide sufficient strength to support the screen in a taut, pre-tensioned manner under loading of the material process through the screen. The screen is pre-tensioned so that it will process the desired physical operating characteristics when used in the usual vibrating classifier or separator. Stainless steel is generally used to provide a surface resistance to corrosive materials or non-contaminating surface to food stuffs that may be processed therethrough.

Screen frames, when not formed of thick stainless steel stock, have been bonded to the screen whereby the useful life of the complete structure including screen and frame is limited by the useful life of the screen.

It is therefore an object of this invention to provide a combined screen and frame structure wherein the screen portion may be readily replaced and the frame members re-used.

Another object of this invention is to provide a combination screen and frame structure in which the screen is replaceable and is simple and inexpensive to manufacture and assemble.

A still further object of the present invention is to provide a replaceable screen structure in which the screen is secured to a mounting ring which maintains the flat taut shape of the screen.

A still further object of the present invention is to provide a classifier screen and frame structure in which the screen is readily replaceable including provision for preventing rotation of the screen with respect to the frame.

Still another object of the present invention is to provide a classifier screen and frame structure wherein the screen is readily replaceable and the frame structure may be easily disassembled for removal replacement of the screen.

Still another object of the present invention is to provide a classifier screen adapted to be held in a frame structure including resilient gasketing means bonded to the screen at the position where the frame clamps the screen.

These and other objects and the attendant advantages of the present invention will be more fully understood from the following detailed description and the accompanying drawings wherein:

FIGURE 1 is a plan view of the combined screen and frame structure.

FIGURE 2 is a detail cross-sectional view of the screen and frame structure taken along lines 2—2 in FIGURE 1.

FIGURE 3 is a cross-sectional view similar to FIGURE 2 illustrating another form of the present invention.

FIGURE 4 is another cross-sectional view similar to FIGURE 2 illustrating another form of structure of the present invention.

FIGURE 5 is another cross-sectional view illustrating still another form of structure of the present invention.

FIGURE 6 is another cross-sectional view similar to FIGURE 2 illustrating a further form of structure of the present invention.

FIGURE 1 illustrates the complete screen and frame assembly 10 which could be used with a material separator and classifier such as is disclosed in the R. P. Miller et al. Patent No. 2,753,999, issued July 10, 1956. The assembly 10 includes the frame unit 11 and the screen 12 is hereinafter more clearly set forth. The central portion of the screen 12 is provided with a central opening 13 and reinforcing member 14 surrounding the opening 13.

In the form of the invention illustrated in FIGURE 2 the screen 12a is bonded to the upper surface of the screen mounting ring 15 by a bonding agent 16 such as an epoxy cement or other suitable material which will provide sufficient bond strength between the screen and the ring to maintain the desired tautness in the screen during use in a material separator or classifier. The screen 12a will be bonded to the upper surface of the mounting ring 15 completely around its outer periphery.

Screen mounting ring 15 is annular and in cross-section preferably has at least one flat surface to which screen 12 may be secured. In the drawing all of the mounting rings are shown to be substantially square in cross-section. A rectangular or square cross-sectional shape is generally preferred for the screen mounting ring of the present invention. The screen mounting ring may be made from ordinary steel which will be substantially less expensive than if it had to be made from stainless steel. This savings in cost is possible since as hereinafter explained the screen mounting ring of the present invention will not be exposed to the material in the material classifier in which it is installed.

The gasketing material 17 is bonded to the screen 12a and the bonding agent 16 from a position at the outer periphery of screen 12a extending inwardly beyond the inner periphery of the ring 15. This gasketing material 17 may be of any suitable resilient material providing the necessary resiliency desired in the clamping of the screen between the upper and lower frame members 18 and 19 as shown. A liquid silicone rubber has been found suitable for this gasketing material. The gasketing material 17 is applied completely around the outer periphery of the screen 12a and extends inwardly on screen 12a to a position radially inward of the inner surface of mounting ring 15 as shown in FIGURE 2.

The upper frame assembly 18 illustrated in FIGURE 2 is a combination of elements which are secured together as by an epoxy bonding agent into a unitary structure whereby all of the frame members exposed to the material in the classifier may be made from a relatively light gauge material and the non-exposed members of heavier and cheaper material. The structure of the upper frame member 18 includes a top retainer ring 20 made of a corrosion resistant material which is annular in shape and includes an upper flat portion 21, a depending portion 22, an outwardly extending portion 23, and a rolled down edge 24. This structure also includes angle member 25 and reinforcing ring 26 which are bonded to the top retaining ring 20 by the bonding agent 27. Angle member 25 and reinforcing ring 26 being wholly contained may be made of a suitable material such as mild steel.

Lower frame member 19 also is preferably made of a corrosion-resistant material, is annular in shape, and in cross-section includes inwardly directed flange portion 28, a depending portion 29 and the flat outwardly extending portion 30.

Screen mounting ring 15 is positioned in surrounding relation to the vertical portion 29 of lower frame member 19. A minimum amount of clearance should be provided between the inner periphery of ring 15 and the outer periphery of vertical portion 29 of the lower frame member so that ring 15 may easily be positioned as shown in FIGURE 2, allowances being made for reasonable fabrication tolerances in the large diameters of screen mounting ring 15. Portion 30 of lower frame member 19, angle member 25 and reinforcing member 26 of the upper frame structure are all suitably drilled and reinforcing ring 26 is tapped to receive fastener 31 whereby upper frame member is secured and tightened on lower frame member 19. In this position it should be noted that gasketing material 17 will be firmly held between upper flat portion 21 of upper frame member 18 and flange portion 28 of lower frame member 19.

In FIGURE 3 screen 12b has its periphery extended and bent over the outer periphery of a screen mounting ring 32, similar to mounting ring 15 of FIGURE 1 and is secured to screen mounting ring 32 by spot welding through welding strip 33 and screen 12b into the outer periphery of ring 32. Such spot welding 33' will be a plurality of closely spaced spot welds around the outer periphery of ring 32 with each spot extending through welding strip 33 and screen 12b and into ring 32. Lower frame member 34 is substantially the same as lower frame member 19 described in relation to FIGURE 2. Upper frame member 35 is a single structure having substantially the same configuration as the upper frame member assembly 18 and is suitably drilled and tapped to receive fastener 36 for the clamping of the two frame members together. Gasketing material 37 is bonded to screen 12b at a point extending inwardly from the inner periphery of ring 32.

The form of the present invention shown in FIGURE 4 is substantially similar to the form illustrated in FIGURE 2 and hereinbefore described with the exception that the gasketing material 38 is formed surrounding the inner periphery of upper frame member 39 and gasketing material 40 is formed surrounding the inner periphery of flange portion lower frame member 41 whereby frame members 39 and 41 when secured together will clamp screen 12c therebetween at its outer periphery immediately inwardly from screen mounting ring 42. Also FIGURE 4 illustrates schematically the positioning of the frame members 39 and 41 with the screen 12c and screen mounting ring 42 therebetween in the vibrating material classifier C by the supporting means S so that the screen 12c extends across the interior of the classifier C.

The form of the invention illustrated in FIGURE 5 has substantially the same frame members as illustrated in FIGURE 2 except that radially extending key 43 is secured or integrally formed in lower frame member 44. Screen mounting ring 45 is provided with a slot 46 to accommodate key 43 whereby the screen mounting ring 45 and also screen 12d will be held in non-rotative position with respect to the frame members. Also, in FIGURE 5 screen 12d is secured to screen mounting ring 45 by spot welding through welding ring 47 and screen 12d into the upper surface of screen mounting ring 45. Gasketing material 48 is bonded through screen 12d immediately inwardly of screen mounting ring 45 and welding ring 47.

The form of structure illustrated in FIGURE 6 is substantially the same as the form illustrated in FIGURE 2 with two exceptions as follows: First, the gasketing material 49 will be bonded to and through screen 12e but does not extend outwardly beyond the inner periphery of screen mounting ring 50. Second, fastener 51 extends through lower frame member 52 into screen mounting ring 50 to prevent rotation of screen 12 and screen mounting ring 50 with respect to the frame members.

FIGURES 5 and 6 illustrate two additional forms of the invention providing means to prevent rotation of the screen, screen mounting ring structure with respect to the frame members. While one key 43 and slot 46 or one fastener 51 may be adequate it may be advisable in large diameter units to provide two or more of such rotational restraining means. The gasket material will also provide a connection between the frame members and the screen holding the screen against rotation with respect to the frame members.

It should be noted that in all forms of the invention a gasketing material is provided for the clamping of the outer periphery of the screen between the frame members immediately inside of the screen mounting ring. Such gasketing is generally preferred to be a silicone rubber which may be applied in the liquid form. Other materials may be used which will provide a suitable clamping surface and which will seal between the screen and the frame members whereby screen mounting ring and other individual pieces of the frame and screen assembly will not be exposed to the material in the classifier in which the unit is mounted. Such sealing will therefore allow these parts to be made from materials other than corrosive resistant materials and thereby substantially reduce the overall cost of the structure.

Such sealing further allows the combined screen and screen mounting ring structure to be sufficiently inexpensive that when the screen becomes worn or damaged the unit may be quickly and simply replaced and the worn or damaged unit discarded.

From the foregoing it can be seen that the present invention provides a replaceable screen structure for a material separator and classifier. As is well known, this screen structure may be readily installed in a material separator and classifier between the usual supporting means or flanges. This structure provides for the secure anchoring of the screen to the screen mounting ring and for the gasketing of a screen whereby it may be clamped and provide a seal between the inner periphery of the frame members. Further means have been shown for preventing relative rotational movement of the screen and the screen mounting ring with respect to the frame members. In all of the forms of the invention the assembly of the screen and screen mounting ring may be readily removed and replaced with another screen assembly. The frame members are immediately reuseable to clamp a new assembly therein and such screen assembly is sufficiently inexpensive to allow it to be discarded when the screen becomes worn or damaged. The screen when assembled with a screen mounting ring will maintain its relatively taut shape.

What is claimed is:
1. As a subcombination in a vibrating material classifier having supporting means thereon, a screen assembly comprising,
    a foraminous screen,
    a mounting ring,
    the peripheral portion of said screen being secured to said mounting ring with said screen under tension whereby said mounting ring maintains such tension in said screen,
    a pair of light gauge corrosion-resistant metal annular frame members adapted to be secured together in clamping relation to said mounting ring and to be engaged by said supporting means to dispose said screen across the interior of said classifier,
    said mounting ring being removably secured in said frame members with said frame members isolating said mounting ring from the interior of said classifier, and
    a reinforcing ring positioned between said frame members independent of said mounting ring and secured to one of the frame members to reinforce said frame members,
    said reinforcing ring being of a material relatively non-resistant to corrosion in relation to the corrosion-resistant material of said frame members.

2. A screen structure for vibrating material classifier having supporting means thereon, comprising
    a foraminous screen,
    a mounting ring,
    the peripheral portion of said screen being secured to said mounting ring under tension whereby said mounting ring maintains tautness of said screen,
    frame members adapted to be releasably secured in clamping relation to said mounting ring and to be engaged by said supporting means to dispose said screen across the interior of said classifier, said mounting ring being removably held only by said frame members, and a reinforcing ring positioned between said frame members independent of said mounting ring and secured to one of said frame members to provide reinforcement for said frame members, said frame members including an outer radial portion, an intermediate upstanding portion and an inner radial portion, the outer radial portion of one of said frame members being substantially wider than the outer radial portion of the other frame member whereby said upstanding portions of said frame members, when clamped together, are spaced radially from each other to define an annular recess in which said mounting ring and said reinforcing ring are received.

3. A screen structure according to claim 2 including means coacting with said mounting ring to prevent relative movement of said mounting ring in said frame members.

4. A screen structure according to claim 3, wherein said coacting means includes, a slot defined by said mounting ring, and a key secured to one of said frame members and adapted to be positioned in said slot to prevent relative rotation of said mounting ring in said frame members.

5. As a subcombination in a vibrating classifier having supporting means thereon, a screen assembly comprising, a foraminous screen, a mounting ring, means for bonding said screen to said mounting ring under a preselected tension and to coact with said mounting ring to maintain said tension in said screen, said mounting ring and said bonding means being the sole means for maintaining tension in said screen, and a pair of corrosion-resistant annular frame members adapted to be secured together and to be engaged by said supporting means of said classifier, said frame members defining an annular recess in which said mounting ring is positioned when said frame members are secured together in said supporting means to position said screen across the interior of said classifier, said mounting ring being of a material relatively nonresistant to corrosion in relation to the corrosion-resistant material of said frame members, said frame members when secured together, engaging said screen in sealing engagement to isolate said mounting ring from the interior of said classifier.

6. The sub-combination according to claim 5 including means coacting between said mounting ring and said frame members for preventing rotation of said mounting ring with respect to said frame members.

7. The subcombination according to claim 5, including gasketing material positioned between said screen and said frame members to effect said sealing engagement, said frame members engaging said gasketing material in sealing engagement without changing the tension maintained in said screen by said mounting ring.

References Cited

UNITED STATES PATENTS

| | | | |
|---|---|---|---|
| 1,923,970 | 8/1933 | Dowling | 160—380 |
| 2,950,819 | 8/1960 | Holman et al. | 209—332 XR |
| 3,029,946 | 4/1962 | Wright et al. | 209—405 |
| 3,243,042 | 3/1966 | Moulton | 209—403 |

FOREIGN PATENTS

| | | |
|---|---|---|
| 638,888 | 6/1950 | Great Britain. |

FRANK W. LUTTER, *Primary Examiner.*

HARRY B. THORNTON, *Examiner.*

L. H. EATHERTON, *Assistant Examiner.*